Aug. 4, 1936.   W. ROSETT   2,049,472
CUPROUS OXIDE PHOTOELECTRIC CELL
Filed Feb. 25, 1932
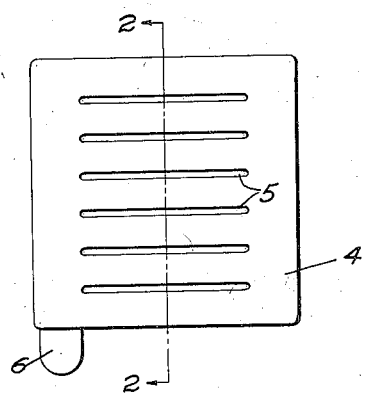
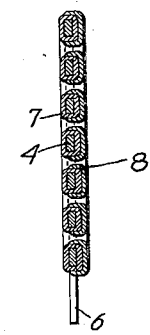
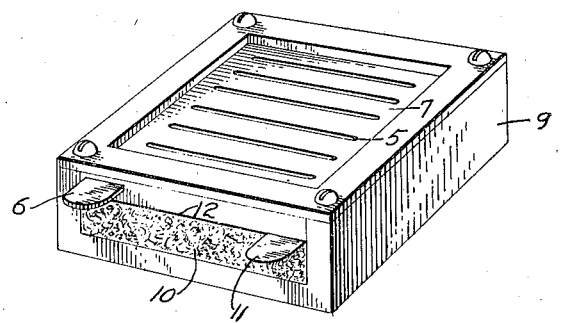
INVENTOR
*Walter Rosett*
BY
ATTORNEY Patented Aug. 4, 1936

2,049,472

UNITED STATES PATENT OFFICE 2,049,472

CUPROUS OXIDE PHOTOELECTRIC CELL

Walter Rosett, Oakcrest, Va.

Application February 25, 1932, Serial No. 595,115

6 Claims. (Cl. 136—89)

(Granted under the act of March 3, 1883, as amended April 30, 1928; 370 O. G. 757)

This invention relates to a method of making a photo-electric cell of the cuprous oxide type, and has for its object such a cell in which the internal resistance is lower than in those now in use, in which the conducting metal on the oxide layer is integrally bonded thereto, and in which there is a maximum of oxide surface exposed to the action of light.

With the above and other objects in view, the invention consists in the construction, combination and arrangement of parts as will be described more fully hereinafter.

Reference is to be had to the accompanying drawing forming a part of this specification, in which like reference characters indicate corresponding parts throughout the several views, and in which:

Fig. 1 is a side view of the cell element made according to my invention;

Fig. 2 is a section thereof on the line 2—2, Fig. 1;

Fig. 3 is a perspective view of my invention mounted ready for use.

It should be understood that the words "cuprous oxide type" are used herein as a generic term for purposes of illustration, and include any cell wherein the photo-active element is a metal of suitable electrical and chemical characteristics, such as silver or copper, having on it a layer of a compound of the metal with an element chosen from the group oxygen, sulphur, selenium and tellurium, such as cuprous sulphide, cuprous selenide, cuprous telluride, silver selenide, etc.

The efficiency of cells of this type depends, among other things, upon the physical condition of the cuprous layer and upon the internal photo-electric potential between the cuprous layer and the mother copper on the one hand and/or the cuprous layer and the metal used to make contact therewith. This potential depends upon the elementary character of the metal and upon the nature of the physical contact.

The usual method of making a cuprous oxide cell is to heat the copper sheet in contact with air, the oxygen thereof combining with the copper to form cuprous oxide, while at the same time an outer layer of cupric oxide is formed on the cuprous oxide. The cupric oxide must be removed before an appreciable photo-electric effect can be obtained from the cell, which is generally done mechanically by scraping. It is preferable to remove it chemically, as it is almost impossible to remove it mechanically without injuring to some extent the cuprous oxide crystals. An effective method of destroying the cupric film is to immerse the cell element in a boiling saturated solution of ammonium chloride, then washing it with water and drying it.

I have found that a pure cuprous oxide layer can be formed without simultaneously producing a film of cupric oxide by heating the copper in an atmosphere of an inert gas such as helium or nitrogen until it reaches the temperature at which the cuprous oxide is formed (about one thousand degrees centigrade) and continuing the heating in an atmosphere containing oxygen for about one hour. It may then be cooled in an inert atmosphere or as hereinafter set forth. Heating for the time specified forms a layer of the thickness that I have found to develop a higher photo-electric potential than is obtained otherwise. It has hitherto been held that the most efficient cell was produced by having the thinnest possible coating of cuprous oxide, but my experiments have shown that the output of the cell becomes greater with increasing thickness of the oxide layer until that thickness is such that the rate of rise in the internal resistance drop of potential across the cell is relatively greater than the increased E. M. F. increment due to the light absorption, and this optimum depth of oxide layer is produced by heating at the temperature and for the time specified.

It is preferable to remove the copper element from the furnace and plunge it into a reducing oil such as tung oil, fish oil, lard oil, or petroleum jelly, which cools all parts of the element simultaneously and reduces the surface film of the oxide layer to the metallic state and since it is formed from the oxide itself there is the most intimate possible bond between them—better than can be formed by electrolytic deposition or by sputtering as is the usual practice. Any desired form of conducting grid may be produced by painting with petroleum jelly the portions of the metal coating it is desired to retain and removing the rest by reverse electrolysis or by treating with a solvent of the metal, such as fresh aqua regia. If the latter be used, the acid remaining on the element should be neutralized and the element washed with water. The reduction of the oxide to the metal can be done in an atmosphere of a reducing gas, but as the gas penetrates more deeply into the oxide layer during cooling than does the oil, the latter is preferred.

A form of copper element that I have found to be highly satisfactory is shown in Fig. 1, wherein the plate 4 has narrow parallel slits 5 and a tab 6 for making connection to the unchanged mother copper of the cell. When heated, the coating 7 of oxide is formed on all surfaces, part of which is reduced to the metallic state as above described to form the film 8, the metal being removed from one face of the plate to expose the oxide coating as indicated on the left hand side of Fig. 2. The element is housed in a suitable box 9 with the exposed oxide layer facing outwardly and the metallic film 8 in contact with a sheet of metal foil 12 that is pressed thereagainst by a sponge rubber pad 10, the tab 11 serving to make the connection to the foil. When the circuit is closed between tabs 6 and 11 and light falls upon the oxide coating 7 an electric current flows through the circuit. It will be seen that in my cell there is no part of the oxide layer on the face that is exposed to the light that is covered by the metallic film used to make electric contact with the oxide and hence there is a larger portion of the oxide coating that is effective in the production of the photo-electric current than if the conducting grid were on the light receiving face. The extension of the metallic film 8 through slots 5 gives the full electrical equivalent of a grid on the exposed face without the disadvantage of covering any of the photo-active oxide coating.

A cuprous selenide cell is made by heating copper in an atmosphere of selenium and a silver telluride cell is likewise made by heating a silver plate in an atmosphere of tellurium, etc. In all cases the preliminary heating of the metal is in an inert gas, the metal plate, temperature and combining atmosphere being varied to produce the combination desired. The metals and compounds specified are given by way of illustration only and not of limitation.

It will be understood that the above description and accompanying drawing comprehend only the general and preferred embodiment of my invention, and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalty thereon.

I claim:

1. A method of making photo-electric elements, comprising the steps of forming slots in a suitable piece of copper, heating said copper in an inert atmosphere to substantially one thousand degrees centigrade, permitting access of oxygen to said copper and continuing the heating for substantially one hour, cooling the element uniformly in a suitable chemically reducing medium, and removing the reduced metal from substantially one entire face only of said element.

2. A method of making photo-electric elements, comprising the steps of forming a grid of a metal selected from the group copper and silver, heating said grid in an inert atmosphere, then continuing the heating in an atmosphere of an element chosen from the group oxygen, sulphur, selenium and tellurium to form on said grid a coating of a compound of the metal with the element in said atmosphere, cooling said grid uniformly in an oleaginous reducing agent and removing the reduced metal from one face only of the grid.

3. A method of making photo-electric elements, comprising the steps of forming a grid of a metal selected from the group copper and silver, heating said grid in an inert atmosphere, then continuing the heating in an atmosphere of an element chosen from the group oxygen, sulphur, selenium and tellurium to form on said grid a coating of a compound of the metal with the element in said atmosphere, cooling said grid uniformly in a medium that will reduce a surface film of said compound to the metallic state and removing such reduced metal from one face only of the grid.

4. A method of making photo-electric elements, comprising the steps of forming a grid of a metal chosen from the group copper and silver, heating said grid in an inert atmosphere, then continuing the heating in an atmosphere of an element from the group oxygen, sulphur, selenium and tellurium, then plunging said grid into an agent having reducing characteristics similar to tung oil, lard oil, fish oil or petroleum jelly to reduce a surface layer of the compound formed during the second step of the heating and removing the reduced metal from only one face of the grid but leaving said reduced metal over all other faces thereof.

5. A method of making photo-electric elements, comprising the steps of forming a grid of silver, heating said grid in an inert atmosphere, then continuing the heating in an atmosphere of an element from the group oxygen, sulphur, selenium and tellurium, then plunging said grid into an agent having reducing characteristics similar to tung oil, lard oil, fish oil or petroleum jelly to reduce a surface layer of the compound formed during the second step of the heating and removing the reduced metal from only one face of the grid but leaving said reduced metal over all other faces thereof.

6. A method of making photo-electric elements, comprising the steps of forming a grid of copper, heating said grid in an inert atmosphere, then continuing the heating in an atmosphere of an element from the group sulphur, selenium and tellurium, then plunging said grid into an agent having reducing characteristics similar to tung oil, lard oil, fish oil or petroleum jelly to reduce a surface layer of the compound formed during the second step of the heating and removing the reduced metal from only one face of the grid but leaving said reduced metal over all other faces thereof.

WALTER ROSETT.